(12) United States Patent
Lubowitz et al.

(10) Patent No.: US 8,309,663 B2
(45) Date of Patent: Nov. 13, 2012

(54) WATER-ENTRAINED-POLYIMIDE CHEMICAL COMPOSITIONS FOR USE IN HIGH-PERFORMANCE COMPOSITE FABRICATION

(75) Inventors: Hyman Ralph Lubowitz, Rolling Hills Estates, CA (US); Thomas Karl Tsotsis, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 697 days.

(21) Appl. No.: 11/755,785

(22) Filed: May 31, 2007

(65) Prior Publication Data

US 2008/0300360 A1 Dec. 4, 2008

(51) Int. Cl.
C08G 73/10 (2006.01)
(52) U.S. Cl. ......... 525/420; 528/335; 528/336; 524/845
(58) Field of Classification Search .................. 524/845; 528/335, 336; 525/420
See application file for complete search history.

(56) References Cited

U.S. PATENT DOCUMENTS

| | | | |
|---|---|---|---|
| 3,565,549 A | 2/1971 | Lubowitz et al. | |
| 3,745,149 A | 7/1973 | Serafini et al. | |
| 4,255,471 A * | 3/1981 | Boldebuck et al. | 427/385.5 |
| 4,414,269 A | 11/1983 | Lubowitz et al. | |
| 4,476,184 A | 10/1984 | Lubowitz et al. | |
| 4,536,559 A | 8/1985 | Lubowitz et al. | |
| 4,547,553 A | 10/1985 | Lubowitz et al. | |
| 4,584,364 A | 4/1986 | Lubowitz et al. | |
| 4,661,604 A | 4/1987 | Lubowitz et al. | |
| 4,684,714 A | 8/1987 | Lubowitz et al. | |
| 4,739,030 A | 4/1988 | Lubowitz et al. | |
| 4,847,333 A | 7/1989 | Lubowitz et al. | |
| 4,851,495 A | 7/1989 | Sheppard et al. | |
| 4,851,501 A | 7/1989 | Lubowitz et al. | |
| 4,868,270 A | 9/1989 | Lubowitz et al. | |
| 4,871,475 A | 10/1989 | Lubowitz et al. | |
| 4,876,328 A | 10/1989 | Lubowitz et al. | |
| 4,935,523 A | 6/1990 | Lubowitz et al. | |
| 4,958,031 A | 9/1990 | Sheppard | |
| 4,965,336 A | 10/1990 | Lubowitz et al. | |
| 4,980,481 A | 12/1990 | Lubowitz et al. | |
| 4,981,922 A | 1/1991 | Sheppard et al. | |
| 4,985,568 A | 1/1991 | Lubowitz et al. | |
| 4,990,624 A | 2/1991 | Sheppard et al. | |
| 5,011,905 A | 4/1991 | Lubowitz et al. | |
| 5,066,541 A | 11/1991 | Lubowitz et al. | |
| 5,071,941 A | 12/1991 | Lubowitz et al. | |
| 5,081,198 A | 1/1992 | Pater | |
| 5,082,905 A | 1/1992 | Lubowitz et al. | |
| 5,087,701 A | 2/1992 | Lubowitz et al. | |
| 5,104,967 A | 4/1992 | Sheppard et al. | |
| 5,109,105 A | 4/1992 | Lubowitz et al. | |
| 5,112,939 A | 5/1992 | Lubowitz et al. | |
| 5,115,087 A | 5/1992 | Sheppard et al. | |
| 5,116,935 A | 5/1992 | Lubowitz et al. | |
| 5,120,819 A | 6/1992 | Lubowitz et al. | |
| 5,126,410 A | 6/1992 | Lubowitz et al. | |
| 5,144,000 A | 9/1992 | Sheppard et al. | |
| 5,151,487 A | 9/1992 | Lubowitz et al. | |
| 5,155,206 A | 10/1992 | Lubowitz et al. | |
| 5,159,055 A | 10/1992 | Sheppard et al. | |
| 5,171,822 A | 12/1992 | Pater | |
| 5,175,233 A | 12/1992 | Lubowitz et al. | |
| 5,175,234 A | 12/1992 | Lubowitz et al. | |
| 5,175,304 A | 12/1992 | Sheppard et al. | |
| 5,198,526 A | 3/1993 | Lubowitz et al. | |
| 5,210,213 A | 5/1993 | Sheppard et al. | |
| 5,216,117 A | 6/1993 | Sheppard et al. | |
| 5,227,461 A | 7/1993 | Lubowitz et al. | |
| 5,239,046 A | 8/1993 | Lubowitz et al. | |
| 5,268,519 A | 12/1993 | Sheppard et al. | |
| 5,286,811 A | 2/1994 | Lubowitz et al. | |
| 5,338,827 A | 8/1994 | Serafini et al. | |
| 5,344,894 A | 9/1994 | Lubowitz et al. | |
| 5,367,083 A | 11/1994 | Sheppard et al. | |
| RE34,820 E | 1/1995 | Lubowitz et al. | |
| 5,403,666 A | 4/1995 | Lubowitz et al. | |
| 5,412,065 A | 5/1995 | Amone et al. | |
| 5,412,066 A | 5/1995 | Hergenrother et al. | |
| 5,446,120 A | 8/1995 | Lubowitz et al. | |
| 5,455,115 A | 10/1995 | Lubowitz et al. | |
| 5,463,076 A | 10/1995 | Sheppard et al. | |
| 5,506,060 A | 4/1996 | Lubowitz et al. | |
| 5,512,676 A | 4/1996 | Sheppard et al. | |
| 5,516,876 A | 5/1996 | Lubowitz et al. | |
| 5,521,014 A | 5/1996 | Lubowitz et al. | |
| 5,530,089 A | 6/1996 | Sheppard et al. | |
| 5,550,204 A | 8/1996 | Lubowitz et al. | |
| 5,554,769 A | 9/1996 | Sheppard et al. | |
| 5,573,854 A | 11/1996 | Sheppard et al. | |
| 5,602,226 A | 2/1997 | Lubowitz et al. | |
| 5,618,907 A | 4/1997 | Lubowitz et al. | |
| 5,645,925 A | 7/1997 | Sheppard et al. | |
| 5,654,396 A | 8/1997 | Lubowitz et al. | |
| 5,693,741 A | 12/1997 | Sheppard et al. | |
| 5,705,574 A | 1/1998 | Lubowitz et al. | |
| 5,705,598 A | 1/1998 | Lubowitz et al. | |
| 5,739,256 A | 4/1998 | Lubowitz et al. | |

(Continued)

FOREIGN PATENT DOCUMENTS

EP 0 626 412 A 11/1994

(Continued)

OTHER PUBLICATIONS

Southcott Mark, et al., "The development of processable, fully imidized, polyimides for high-temperature applications", *High Perform. Polym.*, 6 (1994) pp. 1-12.

*Primary Examiner* — Kelechi Egwim
(74) *Attorney, Agent, or Firm* — Alston & Bird LLP

(57) ABSTRACT

Water-entrained compositions comprising colloidal or suspensoidal solutions comprising polyimide pre-polymers/oligomers are described. These compositions are obtained in water by initial dispersion of the resin constituents in water to from colloids or suspensoids. The water-entrained polyimide compositions can be applied to numerous surfaces or more beneficially used for composite fabrication. The coated surfaces or polyimide-pre-polymer impregnated reinforcing materials are subsequently cured and are ideal for providing thermal protection.

11 Claims, No Drawings

U.S. PATENT DOCUMENTS

| | | |
|---|---|---|
| 5,756,645 A | 5/1998 | Lubowitz et al. |
| 5,780,583 A | 7/1998 | Lubowitz et al. |
| 5,817,738 A | 10/1998 | Lubowitz et al. |
| 5,817,744 A | 10/1998 | Sheppard et al. |
| 5,968,640 A | 10/1999 | Lubowitz et al. |
| 5,969,079 A | 10/1999 | Lubowitz et al. |
| 6,124,035 A | 9/2000 | Connell et al. |
| 6,569,954 B1 | 5/2003 | Sheppard et al. |
| 6,958,192 B2 | 10/2005 | Hergenrother et al. |
| 7,041,778 B1 | 5/2006 | Curliss et al. |
| 2005/0080229 A1 | 4/2005 | Deets et al. |

FOREIGN PATENT DOCUMENTS

| | | |
|---|---|---|
| EP | 0 887 364 A | 12/1998 |
| JP | 2001270943 A * | 10/2001 |
| JP | 2001270945 A * | 10/2001 |
| WO | WO 03/087194 A | 10/2003 |

* cited by examiner

WATER-ENTRAINED-POLYIMIDE CHEMICAL COMPOSITIONS FOR USE IN HIGH-PERFORMANCE COMPOSITE FABRICATION

BACKGROUND OF THE INVENTION

Embodiments of the present invention relate to water-entrained-polyimide chemical compositions comprising stable aqueous-based colloidal solutions for use in high-performance composite fabrication and methods of making the same.

It is well known in the art that polyimides exhibit properties desirable for high-temperature applications such as those demanded in the aerospace industry. Existing materials are primarily based on Polymerization of Monomeric Reactants (PMR) chemistry and are with a few exceptions, only suitable for prepreg. Additionally, these materials are plagued with various deficiencies. For example, PMR-15, which is described in U.S. Pat. No. 3,745,149, contains a known carcinogen 4,4-methylene dianiline (MDA), is prone to microcracking, difficult to handle during processing and has a short shelf life. Many PMR materials cannot be used for thick composites due to unwanted reaction byproducts.

Past methods, based primarily on PMR chemistry, of synthesizing polyimide oligomers require the use of either dimethylformamide (DMF) or an alcohol-based solvent. The use of DMF leads to processing difficulties due to the need for removing the DMF prior to the final cure. The difficulty in removing DMF prompted the utilization of alcohol-based systems for synthesizing polyimide oligomers (e.g. RP-46, PMR-II-50, PETI-330 and AFR-PE-4). However, the use of alcohol-based solvents in the synthesis of polyimides also has shortcomings. In particular, dissolution of the reactants in alcohol-based systems often leads to unwanted side reactions between the alcohol and the monomers and/or oligomers used in the reaction. Specifically, dissolution in alcohol, according to PMR chemistry, forms half esters that interfere with the formation of polyimides. These unwanted byproducts have an adverse impact on the properties of the finished products.

Accordingly, there continues to be a need for an aqueous-based system for polyimide oligomers suitable for high-performance composites that mitigate health and toxicity problems, are easily processed and exhibit improved thermo-oxidative stability. In particular, the aerospace industry presently has a need for composites and laminates that can be safely produced at a low cost and provide long-term thermal protection for temperatures up to 700° F.

BRIEF SUMMARY OF THE INVENTION

Embodiments of the present invention satisfy at least some of the aforementioned needs by providing an aqueous-based system for polyimide oligomers. Water-entrained compositions comprising colloidal solutions comprising polyimide pre-polymers/oligomers are described. The water-entrained polyimide compositions are obtained by either co-reacting a polyamine and a polyanhydride with a specific endcapping monomer or by directly reacting an amine-functional endcap monomer with a suitable chemical backbone. The water-entrained polyimide compositions can be applied to numerous surfaces and used for composite fabrication. The coated surfaces or polyimide pre-polymer-impregnated reinforcing materials are subsequently cured and are ideal for providing thermal protection.

Embodiments of the present invention comprise an aqueous-based method for preparing polyimide oligomers as colloids or suspensoids; wherein the use of hazardous solvents are eliminated and undesirable side reactions are avoided. Accordingly, embodiments of the present invention provide resin solutions suitable for preparing high-temperature polyimides suitable for composite fabrication.

DETAILED DESCRIPTION OF THE INVENTION

The present invention now will be described more fully hereinafter, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements.

As previously discussed, polymeric resins for high temperature composites have historically utilized solvents such as dimethylformamide (DMF) or alcohol-based systems for synthesizing polyimide oligomers. Embodiments of the present invention may be formed in accordance with any of the traditional approaches, namely PMR chemistry, except that an aqueous-based system is utilized. The use of DMF and other similar solvents creates processing difficulties. On the other hand, dissolution of reactants in alcohol-based systems often leads to unwanted side reactions between the alcohol and the monomers and/or oligomers used in the reaction. Specifically, dissolution in alcohol, according to PMR chemistry, forms half esters that interfere with the formation of polyimides. The problem of unwanted side reaction byproducts due to the dissolution of the reactants in alcohol is illustrated below.

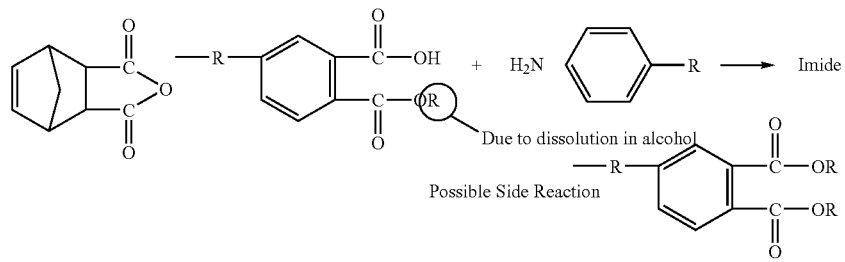

In view of the inadequacies associated with the traditional approaches, embodiments of the present invention can be formed in an aqueous-based system. In particular, embodiments of the present invention are formed by performing the polymerization reaction in water. As illustrated below, this approach eliminates the production of unwanted byproducts.

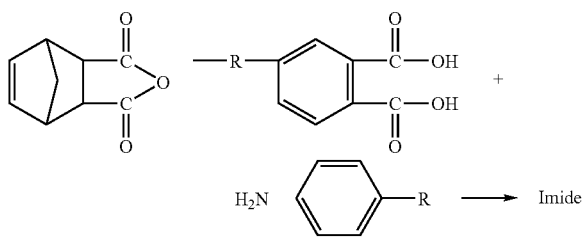

If desired, subsequent addition of alcohol to the aqueous-based system does not have the same detrimental effect as when the monomers and/or oligomers are directly dissolved in alcohol because the side reaction of the anhydride with alcohol to form the diester will not occur at the moderate temperatures used for preparing coated fabrics or performs suitable for manufacturing composite parts. Thus, the addition of alcohol to the aqueous-based system may be added to improve flow, wet-out, and increase tack (e.g. as an entraining material) without causing unwanted reaction byproducts provided that the alcohol is removed prior to processing at temperatures that will induce imidization. Accordingly, resins for use in high temperature polymeric composites can easily be produced by using the aqueous-based system for polyimide oligomers described above.

In one aspect, embodiments of the present invention relate to water-entrained compositions comprising colloidal or suspensoidal solutions comprising polyimide oligomers/pre-polymers for use in high-performance composites and reinforced laminates of improved thermal stability and methods of making the same.

In one such embodiment, a water-entrained polyimide comprises the polymerization reaction product of a polyfunctional amine (e.g. an aromatic diamine), polyfunctional anhydride (e.g. an aromatic dianhydride), and at least one mono-anhydride endcap; wherein the reaction is performed in an aqueous-based system.

Various polyfunctional amines such as diamines, triamines and tetramines may be used. In various embodiments, however, diamines are preferred. Polyfunctional amines suitable for specific embodiments include but are not limited to, for example, the following compounds:
3-methoxyhexamethylene diamine;
2,5-dimethylhexamethylene diamine;
2,5-dimethylheptamethylene diamine;
5-methylnonamethylene diamine;
1,4-diamino-cyclohexane;
1,2-diamino-octodecane;
2,5-diamino-oxadiazole;
2,2-bis(4-aminophenyl)hexafluoro propane;
N-(3-aminophenyl)-4-aminobenzamide;
metaphenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis(4-amino-phenyl)diphenyl silane;
3,3'-dichloro-benzidine;
bis-(4-amino-phenyl)phenyl phosphide oxide;
bis-(4-amino-phenyl)-N-phenylamine;
bis-(4-amino-phenyl)-N-methyl-amine;
1,5-diamino-naphthalene;
3,3'-dimethyl-4,4'-diamino-biphenyl;
3,4'-dimethyl-3',4-diamino-biphenyl;
3,3'-dimethoxy benzidine;
2,4-bis(beta-amino-t-butyl)toluene;
para-bis-(2-methyl-4-amino-pentyl)benzene;
para-bis-(1,1-dimethyl-5-amino-pentyl)benzene;
m-xylylene diamine;
3-methylheptamethylene diamine;
4,4-dimethyl-heptamethylene diamine;
2,11-diamino-dodecane;
1,2-bis-(3-aminopropoxy)ethane;
2,2-dimethyl propylene diamine;
1,3-diamino adamantane;
3,3'-diamino-1,1' diadamantane;
3,3'-diaminomethyl-1,1'-diadamantane;
bis(para-amino-cyclohexyl)methane;
hexamethylene diamine;
heptamethylene diamine;
octamethylene diamine;
nonamethylene diamine; and
decamethylene diamine.

Polyfunctional anhydrides suitable for specific embodiments include but are not limited to, for example, the following compounds:
bis(3,4-dicarboxyphenyl)methane dianhydride;
bis(3,4-dicarboxyphenyl)sulfone dianhydride;
benzene-1,2,3,4-tetracarboxylic dianhydride;
3,4,3',4'-benzophenone tetracarboxylic dianhydride;
pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2'-bis(3,4-dicarboxyphenyl)propane dianhydride;
3,4,9,10-perylene tetracarboxylic dianhydride;
bis(3,4-dicarboxyphenyl)ether dianhydride;
naphthalene-1,2,4,5-tetracarboxylic dianhydride;
naphtalene-1,4,5,8-tetracarboxylic dianhydride;
decahydronaphthalene-1,4,5,8-tetracarboxylic dianhydride;
phenanthrene-1,8,9,10-tetracarboxylic dianhydride;
2,2-bis(2,3-dicarboxyphenyl)propane dianhydride;
1,1-bis(3,4-dicarboxyphenyl)ethane dianhydride;
bis(2,3-dicarboxyphenyl)methane dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride; and
2,3,6,7-tetrachloronaphthalene-1,4,5,8-tetracarboxylic dianhydride.

Mono-anhydride endcaps suitable for specific embodiments include but are not limited to, for example, the following compounds:

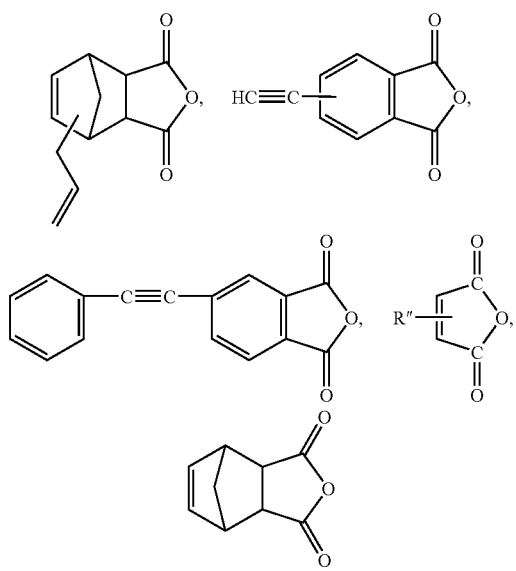

In another embodiment, water-entrained polyimide compositions comprise the polymerization reaction product of an amine-functional endcap and a suitable chemical backbone. In various embodiments, the chemical backbone may comprise an acid anhydride. Any endcap comprising amine functionality is contemplated, such as a nadic-based endcap.

Water-entrained polyimide compositions of embodiments of the present invention may be characterized as aqueous-based dispersions or colloidal/suspensoidal solutions since the compositions comprise polyimide pre-polymers which are not completely soluble in water.

The water-entrained polyimide compositions according to embodiments of the present invention may contain, if desired, various additives. One particularly useful type of additive is stabilizing agents to prevent flocculation of the polyimides. The stabilizers can also include protective colloids such as lignin derivatives, proteins, water-soluble cellulose derivatives, alginic acid, long-chain alcohols, lecithin and sucrose-based stabilizing agents. It is imperative, however, to select stabilizing agents such that they do not cause unwanted side reactions and that are fugitive and do not remain in the final, processed part.

The water-entrained polyimide compositions in accordance with embodiments of the present invention can be formed by utilizing reaction schemes well known in the art for producing polyimides. Unlike prior approaches, however, the preparation of materials suitable for fabricating polyimide composite materials is performed in an aqueous-based system instead of an organic, especially alcohol, solvent. In particular, the imidization reaction is carried-out after removal of all water.

In one embodiment, water-entrained polyimide pre-polymers/oligomers are obtained by first removing the entrained water and then co-reacting polyamines, polyanhydrides and a specific mono-anhydride in approximately stoichiometric or predetermined amounts to form poly-amide acids which are subsequently heated to temperatures up to about 260° C. to form polyimide pre-polymers/oligomers in an aqueous-based system. The polyimide pre-polymers obtained from the polyamide-acids may be characterized as chain-extended polyimides of relatively low molecular weight which contain an aliphatic and/or aromatic backbone with a specified end-capping or terminal group. A particular endcapping group should be capable of becoming chemically reactive by the application of elevated temperatures to form substantially cured polyimide resins. It is believed that the terminal groups react with the application of heat, thereby causing the low-molecular-weight polyimide pre-polymers to add essentially end to end to form macromolecules having average molecular weights of at least 10,000.

The polyamide-acids/polyimide precursors may be obtained by conventional techniques, for example, by reacting a chemical equivalent of a polyamine, i.e. an aromatic diamine with an equivalent of anhydride comprising a mixture of a dianhydride and a complimentary mono-anhydride as is well known in the art (e.g. 3,6-endomethylene-5-methyl-1,2,3,6-tetrahydrophthalic anhydride). The mono-anhydride is present in the anhydride mixture in an amount sufficient to endcap the polyimide pre-polymers. Thus, depending upon the average molecular weight of the pre-polymers, the relative amount of the monoanhydride in the mixture will vary, e.g. from about 5.0 to 60 mole percent. It is advantageous that the total chemical equivalents of the polyamine, i.e. diamine substantially equal the total equivalents of the dianhydride and monoanhydride so that a completely cyclized polyimide pre-polymer can be obtained in situ.

In various embodiments, for example, water-entrained polyimide pre-polymers are prepared as follows:

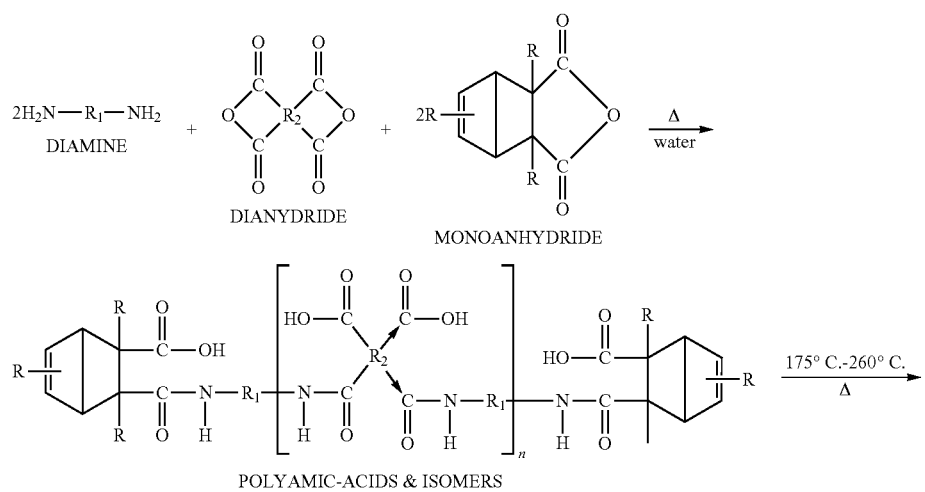

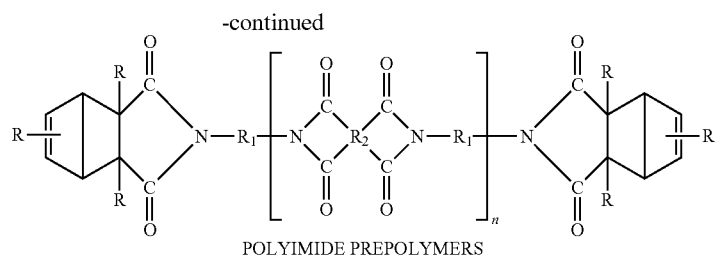

POLYIMIDE PREPOLYMERS

Polyimide compositions previously only available via PMR-based chemistry (alcohol-based systems) can now know be beneficially formed in an aqueous-based system according to embodiments of the present invention to provide aqueous-based colloidal or suspensoidal compositions used in composite fabrication. More specifically, examples of polyimides suitable for composite fabrication that can be prepared in an aqueous-based system according to embodiments of the present invention include those disclosed in U.S. Pat. Nos. 3,745,149 (Serafini et al.), 5,338,827 (Serafini et al.), 5,171,822 (Pater), 5,081,198 (Pater et al.), 7,041,778 (Curliss et al.), 6,958,192 (Hergenrother et al.), 5,412,066 (Hergenrother et al.), and 6,124,035 (Hergenrother et al.).

U.S. Pat. No. 3,745,149 discloses the preparation of polyimides, namely PMR-15, via a solution of monomeric reactants which react in situ to form double-endcap intermediates. PMR-15-type polyimides can be formed according to embodiments of the present invention by forming mixtures of (a) an dialkyl ester of an aromatic tetracarboxylic acid, (b) an aromatic diamine, and (c) an monoalkyl ester of a dicarboxylic acid (as an endcap) in a molar ratio of n:(n+1):2. The monomers are mixed in an aqueous-based system, introduced into a fibrous fabric or perform, laid-up into a desired configuration, have the water removed, and then reacted at elevated temperatures to form, in situ, imide oligomers having endcaps at both ends, and cured at high temperatures to yield macromolecular polyimides. For example, PMR-15 can be formed in an aqueous-based system as follows:

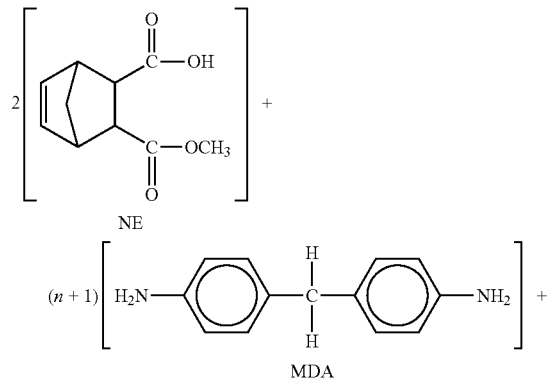

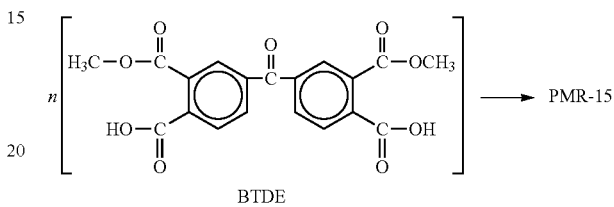

Additionally, polyimide resins as described in U.S. Pat. No. 5,338,827 can also be formed by preparing a mixture in an aqueous-based system comprising the following monomers: (a) a dialkyl, trialkyl or tetraalkylester of biphenyltetracarboxylic acid; (b) phenylenediamine; and (c) a divalent endcap compound characterized by (i) having at least one unsaturated moiety, (ii) being capable of reacting with the aromatic diamine or the ester to form an endcap radical that precludes further reaction of the aromatic diamine with the ester, and (iii) being capable of undergoing addition polymerization. The molar ratio of (a), (b), and (c) can be adjusted such that heating the mixture forms low-molecular-weight pre-polymers having at least one endcap radical suitable for chain extension and crosslinking to form high-molecular-weight and thermally stable polyimides. The chemical structure, terminal moieties, and formulated molecular weights of the pre-polymers depend on the molar ratio of the reactants as described in U.S. Pat. No. 5,338,827.

U.S. Pat. No. 5,171,822 describes a polymerization of monomer reactants (PMR) system having 3,4'-oxydianiline as the key monomer reactant. One variation of this system, LaRC-RP46, is prepared by reacting together monomethyl ester or 5-norbornene-2,3-dicarboxylic acid (NE), 3,4'-oxydianiline (3,4'-ODA), and dimethyl ester of 3,3',4,4'-benzophenonetetracarboxylic acid (BTDE); this combination is then treated with heat. Embodiments of the present invention provide an aqueous-based system for forming water-entrained compositions comprising these polyimides.

U.S. Pat. No. 5,081,198 discloses the following compounds that can be formed as water-entrained compositions according to embodiments of the present invention:

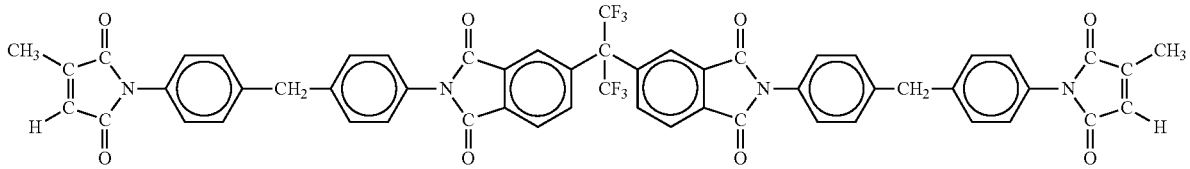

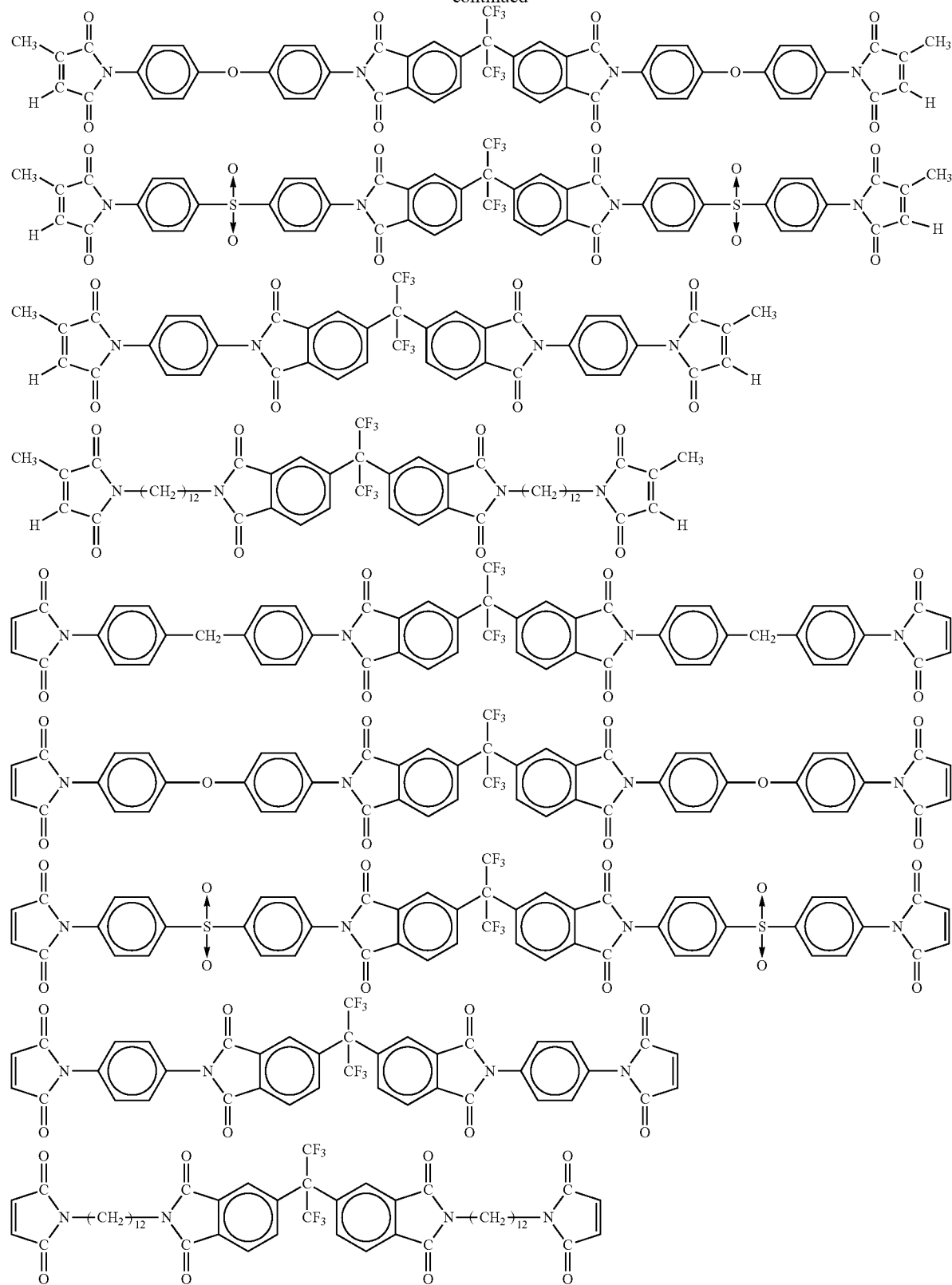
U.S. Pat. No. 7,041,778 discloses a polyimide resin consisting essentially of 3,3',4,4'-benzophenonetetracarboxylic dianhydride (BTDA), 3,4,3',4'-biphenyltetracarboxylic dianhydride (BPDA), 2,2bis(3',4'-dicarboxy phenyl)hexafluoro propane dianhydride (6FDA), 2-(3,4-dicarboxyphenyl)-1-phenylacetylene anhydride (4-PEPA) and an aromatic diamine. Prior to embodiments of the present invention, such resins were only formed by utilization of alcohol-based systems. However, embodiments of the present invention provide an aqueous-based system for forming water-entrained compositions comprising these polyimides.

U.S. Pat. No. 6,958,192 discloses polyimides prepared from 2,3,3',4'-biphenyltetracarboxylic dianhydride and a wide variety of aromatic diamines and polyimides endcapped with phthalic anhydride. Water-entrained polyimides formed 2,3,3',4'-biphenyltetracarboxylic dianhydride and aromatic diamines can also be formed in accordance with embodiments of the present invention in an aqueous-based system.

U.S. Pat. No. 5,412,066 describes a series of phenylethylenyl-terminated imide oligomers that can be thermally cured to resins by employing the following compounds to endcap imide oligomers:

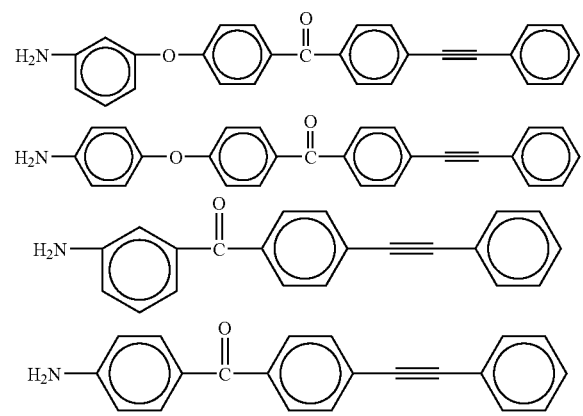

Prior to embodiments of the present invention, phenylethynyl-terminated imide oligomers were prepared by using solvents such as N,N-dimethylacetamide (DMAc), N-methylpyrrolidinone (NMP), N,N-dimethylformamide (DMF) or m-cresol. However, according to embodiments of the present invention, water-entrained phenylethynyl-terminated imide oligomers are prepared in an aqueous-based system.

U.S. Pat. No. 6,124,035 discloses phenylethynyl containing oligomers prepared from aromatic diamines containing phenylethynyl groups and various ratios of phthalic anhydride and 4-phenylethynlphthalic anhydride in glacial acetic acid to form a mixture of imide compounds. These materials can by synthesized as water-entrained compositions according to embodiments of the aqueous-based system of the present invention by reacting aromatic diamines containing phenylethynyl groups with various ratios of phthalic anhydride (PA) and 4-phenylethynyl phthalic anhydride (PEPA) in water.

Additionally, scientists at NASA-Lewis have developed a polyimide resin called AMB-21 which replaces MDA with 2,2-bis(4-[4-aminopnenoxyl]phenyl)propane (BAPP), a non-toxic, non-carcinogenic monomer. AMB-21 has further benefit in that it may be formed into composite components by using resin transfer molding (RTM). According to embodiments of the present invention, AMB-21 can also be obtained in embodiments of the aqueous-based system for forming polyimides suitable for high-temperature composite fabrication.

For the aforementioned and the like, each can be obtained as a water-entrained composition via an aqueous-based system, for example, by hydrolyzing the anhydrides, mixing the necessary reactants and any desired excipients such as stabilizing agents to ensure that the mixture is in suspension (e.g. the mixture does not separate into multiple phases) and performing the initial imidization in the aqueous-based system to form a water-entrained polyimide pre-polymer composition. These water-entrained-polyimide pre-polymer compositions can be consolidated by applying heat to drive-off excess water during initial layout. Curing of the polyimide pre-polymers can then be performed by further processing in the appropriate temperature range, as is known in the art.

It has been found that comparatively high-molecular-weight polyimide resins can be dispersed throughout reinforcing materials, e.g. glass- or carbon-fibers, by polymerizing the polyimide pre-polymers which have average molecular weights ranging from about 500 to 6,000 and preferably from 500 to 3,000. The polyimide pre-polymers are polymerized, in situ, to obtain improved laminated structures at temperatures ranging from about 200 to 350° C. and preferably at temperatures ranging from about 250 to 350° C.

In yet another aspect, embodiments of the present invention are directed to polyimide composites/laminates comprising polyimide resin formed via an aqueous-based system. More specifically, embodiments of this particular aspect of the present invention relates to reinforced-polyimide structures, e.g. glass or carbon laminates obtained by impregnating reinforcing materials with the precursor of a polyimide pre-polymer which in turn is capable of being polymerized, in situ, to a higher-molecular-weight thermally stable polyimide resin.

In various embodiments, polyimide resins are obtained and dispersed throughout the reinforcing materials by applying an aqueous-based composition comprising precursors comprising polyamide-acid to the materials followed by a heating process whereby the precursors are converted to relatively low-molecular-weight polyimide pre-polymers which are highly stable at ambient temperatures.

If desired, the colloidal particles may be passed through a colloid mill until the desired dimensions are obtained. Colloid mills are generally useful for milling, dispersing, homogenizing and breaking down of agglomerates in the manufacture of food pastes, emulsions, coatings, ointments, creams, pulps, grease etc. The main function of the colloid mill is to ensure a breakdown of agglomerates or in the case of emulsions to produce droplets of fine size around 1 micron. Typically, the material to be processed is fed by gravity to the hopper or pumped so as to pass between the rotor and stator elements where it is subjected to high shearing and hydraulic forces. Material is discharged through a hopper whereby it can be re-circulated for a second pass if needed.

These polyimide pre-polymers however, are capable of being converted at temperatures above approximately 200° C. to higher-molecular-weight polyimide resins which bonds the reinforcing material to give a thermally stable composite. The polyimide pre-polymers may have average molecular weights ranging from about 500 to 6,000 and more preferably from 500 to 3,000 and are sufficiently stable at ambient temperatures to allow for handling and storage under conditions considered adverse to the polyimide pre-polymers used heretofore.

The reinforced-polyimide laminated structures presently available, prior to embodiments of the present invention, are known primarily because of their outstanding physical and chemical properties and particularly because of their stability at elevated temperatures. Thus, because of these and other attractive characteristics, the reinforced-polyimide structures, e.g. glass or carbon laminates, have found numerous applications in areas where high-strength and high-temperature materials are needed. However, while the presently available polyimides are desirable they are nevertheless economically at a disadvantage because of the difficulties encountered in handling the pre-polymers and in processing laminates and composites.

In this aspect of the invention, reinforced materials according to embodiments of the present invention may be obtained by a curing mechanism wherein polymerization of the polyimide pre-polymers takes place upon fabrication in situ by the mere application of heat. This particular technique comprises impregnating the reinforcing materials with an aqueous-based composition comprising polyimide precursors comprising polyamide-acids, followed by a drying operation at temperatures ranging up to about 260° C. which not only removes excess water, but also volatiles formed during the cyclization of the precursors to the lower molecular weight polyimide pre-polymers. The pre-polymer-impregnated materials are substantially stable at ambient temperatures and therefore may be stored if desired without any unnecessary precautions for later use. Upon processing in the temperature range of 200° C. to 350° C., the impregnated materials form integral structures due to the polymerization of the polyimide pre-polymers. The materials impregnated with the polyimide resins in accordance with this invention are thermally stable and for that reason may be used for a variety of purposes including, for example, heat-stable laminates, ablative heat-shields, and various other purposes particularly in the aerospace industry.

More specifically, embodiments of the present invention relate to a process for preparing reinforced resinous laminates, e.g. glass- or carbon-fiber laminates of improved thermal stability which comprises impregnating reinforcing materials with an effective amount of an aqueous-based composition comprising either polyimide precursors comprising polyamide-acids. After impregnating the reinforcing materials, the precursor are converted in situ to low-molecular-weight polyimide pre-polymers by the application of heat which completes the cyclization reaction and removes the volatiles from the structure. The laminated structures containing the polyimide pre-polymers are subsequently cured anaerobically by subjecting the impregnated materials to temperatures ranging from about 200° C. to 350° C. at pressures ranging from about atmospheric to 1,000 psi.

In preparing the laminated materials or reinforced articles, for example, the precursors (e.g. polyamide-acids) are prepared in an aqueous-based system wherein the precursors are present in amounts ranging from about 10 to 65 percent and more preferably 25 to 50 percent by weight of the solvent. Following the application of the precursors to the reinforcing materials, excess water may be removed at elevated temperatures to reduce the total reaction time and to obtain substantially dried materials. Subsequently, the impregnated materials are subjected to elevated temperatures ranging up to about 260° C. until completely cyclized, comparatively low-molecular-weight polyimide pre-polymers are obtained in situ.

The pre-polymer-impregnated materials are then subjected to still higher temperatures ranging up to about 350° C. under pressures ranging from atmospheric to 1,000 psi. or more until completely cured resinous structures of improved thermal stability are obtained. Under these conditions of pressure and heat, the cyclized imide pre-polymers are cured with the evolution of a minimum amount of volatiles to a higher-molecular-weight resin which bonds the reinforcing material to form the structure.

Alternative embodiments for preparing reinforced resinous laminates, e.g. glass- or carbon-fiber laminates of improved thermal stability comprise performing the initial imidization reaction in an aqueous-based system to form a water-entrained composition comprising polyimide pre-polymers or oligomers, impregnating reinforcing materials with the water-entrained composition, consolidating the composite by drying at temperatures ranging up to about 260° C. to remove excess water, and anaerobically curing the impregnated materials at a temperature range of about 200° C. to 350° C. at pressures ranging from about atmospheric to 1,000 psi. to form integral structures due to the polymerization of the polyimide pre-polymers/oligomers.

The reinforcing materials may be selected from a variety of known organic or inorganic powders or fibers including, for example, carbon, powdered metals, silicates, asbestos, synthetic fibers, natural fibers, metal filaments, metal oxide powders, and particularly glass or carbon fibers, e.g. glass mats, etc.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An aqueous-based method for preparing polyimide oligomers, comprising:
   (a) preparing an aqueous-based composition comprising at least one polyamine, at least one polyanhydride, and at least one endcap monomer;
   (b) removing entrained water from the aqueous-based composition from step (a);
   (c) subsequent to removing the entrained water, co-reacting the at least one polyamine, at least one polyanhydride, and at least one endcap monomer to form poly-amide acids; and
   (d) heating the poly-amide acids to form polyimide oligomers.

2. An aqueous-based method according to claim 1, wherein the at least one endcap monomer comprises a mono-anhydride endcap monomer.

3. An aqueous-based method according to claim 1, wherein the at least one polyamine comprises an aromatic polyamine, the at least one polyanhydride comprises a dialkyl ester of an aromatic tetracarboxylic acid, and the at least one endcap monomer comprises an monoalkyl ester of a dicarboxylic acid endcap monomer.

4. An aqueous-based method according to claim 1, wherein the at least one polyamine comprises a phenylenediamine, the at least one polyanhydride comprises a dialkyl, trialkyl or tetraalkylester of biphenyltetracarboxylic acid, and the at least one endcap monomer comprises
   a divalent end cap compound characterized by (i) having at least one unsaturated moiety, (ii) being capable of reacting with the polyamine or the ester to form an endcap radical that precludes further reaction of the polyamine with the ester, and (iii) being capable of undergoing addition polymerization.

5. An aqueous-based method according to claim 1, wherein the at least one endcap monomer comprises 5-norbornene-2,3-dicarboxylic acid, the at least one polyamine comprises 3,4'-oxydianiline, and the at least one polyanhydride comprises a dimethyl ester of 3,3',4,4'-benzophenonetetracarboxylic acid.

6. An aqueous-based method according to claim 1, wherein the aqueous-based composition comprises
(i) 3,3',4,4'-benzophenonetetracarboxylic dianhydride; (ii) 3,4,3', 4'-biphenyltetracarboxylic dianhydride; (iii) 2,2 bis (3',4'-dicarboxy phenyl) hexafluoro propane dianhydride; (iv) 2-(3,4-dicarboxyphenyl)-1-phenylacetylene anhydride and (v) an aromatic diamine.

7. An aqueous-based method according to claim 1, wherein the at least one polyanhydride comprises
2,3,3',4'-biphenyltetracarboxylic dianhydride, the at least one polyamine comprises an aromatic diamines, and the at least one endcap monomer comprises phthalic anhydride endcap.

8. An aqueous-based method according to claim 1, wherein the aqueous-based composition includes at least one of the following endcap monomers:

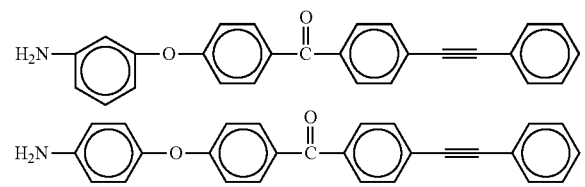

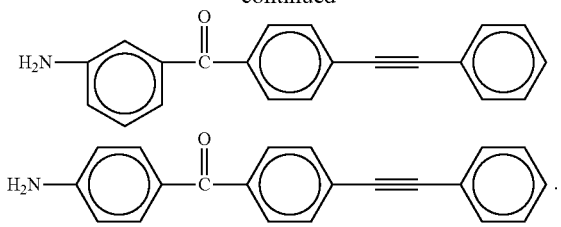

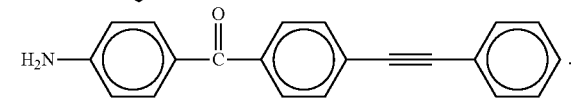

9. An aqueous-based method according to claim 1, wherein the aqueous-based composition includes 2,2-bis(4-[4-aminopnenoxyl]phenyl)propane.

10. The method according to claim 1, wherein the step of heating the poly-amide acids to form polyimide oligomers comprises first heating the poly-amide acids to form polyimide pre-polymers characterized as chain-extended polyimides followed by further application of heat such that the polyimide pre-polymers add end to end to form cured polyimides having an average molecular weight greater than an average molecular weight of the polyimide pre-polymers.

11. The method according to claim 1, wherein imidization is carried-out after removal of all water.

* * * * *